Patented May 16, 1933

1,909,221

UNITED STATES PATENT OFFICE

MAX PAQUIN, OF FRANKFORT-ON-THE-MAIN, GERMANY, ASSIGNOR TO GENERAL ANILINE WORKS, INC., OF NEW YORK, N. Y., A CORPORATION OF DELAWARE

PRINTING COLORS AND PROCESS OF PREPARING THEM

No Drawing. Application filed October 15, 1931, Serial No. 569,115, and in Germany October 20, 1930.

The present invention relates to printing colors and a process of preparing them.

In British specification No. 318,178 there has been described a manufacture of printing colors of good properties by adding to the dyestuff paste a product obtained by condensation of urea or a derivative thereof with an alcohol or a ketone or a derivative thereof as described in German Patent No. 506,963 and patents of addition thereto.

Now, I have found that especially good effects are obtained, particularly in the case of vat-dyestuffs of the anthraquinone series, by adding to the dyestuff printing paste one or more products obtainable by condensing urea or a derivative thereof with the ammonia compound of an aliphatic aldehyde. Such condensation products are obtainable by heating to a temperature of about 60° C. to about 150° C. a urea or a derivative thereof with an aliphatic aldehyde ammonia compound such as, for instance, acetaldehyde-ammonia, preferably in a ratio of 1 molecular proportion of urea to 2 molecular proportions of the aliphatic aldehyde-ammonia compound. At temperatures between 70° C. and 80° C. there is obtained by splitting off 2 mols of water and 1 mol. of ammonia a crystalline triazine derivative probably according to the following equation:

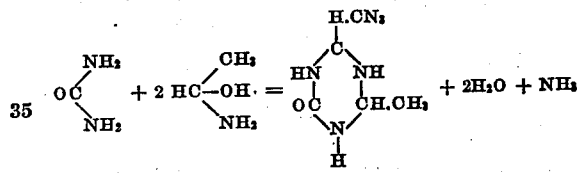

At higher temperatures, for instance, at 105° C.–115° C., there is obtained a brown brittle resin. Both products are well suited for improving printing colors.

The prints obtained in this way are not only considerably deeper in color than the prints obtained with the dyestuff pastes which do not contain the said addition, but they also possess a better and more even shade.

The following examples serve to illustrate the invention, but they are not intended to limit it thereto, the parts being by weight:

(1) 100 parts of N-dihydro-1.2.2'.1'-anthraquinone-azine (No. 838 of Schultz "Farbstofftabellen" 6th edition) of 20 per cent. strength are intimately mixed with 85 parts of the resinous condensation product from urea and acetaldehyde-ammonia and a printing color is prepared from this dyestuff paste by the addition of:

| | Parts |
|---|---|
| Sodium benzylsulfanilate | 15 |
| Glycerine | 40 |
| Potassium carbonate | 60 |
| Sodium formaldehyde sulfoxylate (1:1) | 75 |
| Wheat starch tragacanth thickening | 200 |

The prints obtainable by means of this printing color are essentially more intense than those of the corresponding printing color prepared without an addition of a urea condensation product and they have a purity of color which cannot be produced by means of the last-named printing color even at abnormally high concentration.

(2) 100 parts of monochloro-N-dihydroanthraquinone-azine of 20 per cent. strength of the following formula:

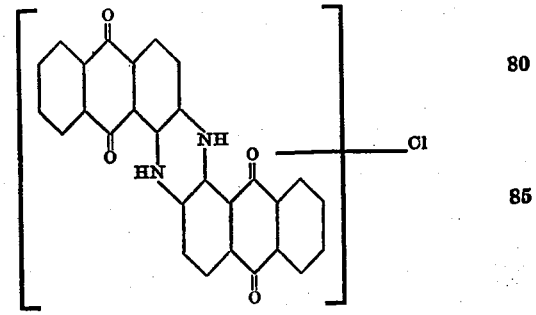

are intimately mixed with 85 parts of the resinous condensation product from urea and crotonaldehyde-ammonia and the printing color is prepared from this mixture in a manner similar to that indicated in Example 1.

(3) 100 parts of dibenzanthrone (No. 763 of Schultz "Farbstofftabellen" 6th edition) of 20 per cent. strength are mixed with 85 parts of the resinous condensation product from urea and aldol-ammonia and the printing color is prepared from this mixture in the manner indicated in Example 1.

(4) 100 parts of the dyestuff No. 1232 of Schultz "Farbstofftabellen", 7th edition, are intimately mixed with 85 parts of the crystalline condensation product from urea and acetaldehyde-ammonia and a printing color is prepared from this dyestuff paste.

(5) 100 parts of the dyestuff No. 1229 of Schultz "Farbstofftabellen", 7th edition, are intimately mixed with 85 parts of the crystalline condensation product from urea and butyraldehyde-ammonia and a printing color is prepared from this dyestuff paste.

(6) 100 parts of the dyestuff No. 1269 of Schultz "Farbstofftabellen", 7th edition, are intimately mixed with 85 parts of the crystalline condensation product from urea and aldol-ammonia and a printing color is prepared from this dyestuff paste.

I claim:

1. As new compositions of matter, printing colors containing a product obtainable by condensing a urea with an aliphatic aldehyde ammonia compound at a temperature of about 60° C. to about 150° C.

2. As new compositions of matter, printing colors from a dyestuff of the anthraquinone series containing a product obtainable by condensing a urea with an aliphatic aldehyde ammonia compound at a temperature of about 60° C. to about 150° C.

3. As new compositions of matter, printing colors from a dyestuff of the anthraquinone series containing a product obtainable by condensing one mol. of urea with two mols of an aliphatic aldehyde ammonia compound at a temperature of about 60° C. to about 150° C.

4. As new compositions of matter, printing colors from a dyestuff of the anthraquinone series containing a product obtainable by condensing one mol. of urea with two mols of acetaldehyde ammonia at a temperature of about 60° C. to about 150° C.

5. As new compositions of matter, printing colors from a dyestuff of the anthraquinone series containing a product obtainable by condensing one mol. of urea with two mols of acetaldehyde ammonia at a temperature of about 70° C. to about 80° C.

6. As new compositions of matter, printing colors from a dyestuff of the anthraquinone series containing a product obtainable by condensing one mol. of urea with two mols of acetaldehyde ammonia at a temperature of about 105° C. to about 115° C.

7. As new compositions of matter, printing colors from N-dihydro-1.2.2'.1'-anthraquinone azine containing a product obtainable by condensing one mol. of urea with two mols of acetaldehyde ammonia at a temperature of about 70° C. to about 80° C.

8. As new compositions of matter, printing colors from N-dihydro-1.2.2'.1'-anthraquinone azine containing a product obtainable by condensing one mol. of urea with two mols of acetaldehyde ammonia at a temperature of about 105° C. to about 115° C.

In testimony whereof, I affix my signature.

MAX PAQUIN.